US006300859B1

(12) United States Patent
Myong et al.

(10) Patent No.: US 6,300,859 B1
(45) **Date of Patent: *Oct. 9, 2001**

(54) CIRCUIT PROTECTION DEVICES

(75) Inventors: Inho Myong, Newark; Wayne Montoya, Redwood City; James Toth, San Carlos, all of CA (US)

(73) Assignee: Tyco Electronics Corporation, Middletown, PA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/379,684

(22) Filed: Aug. 24, 1999

(51) Int. Cl.[7] .............................. H02H 5/04; H02H 9/00; H01C 7/02

(52) U.S. Cl. ............................ 337/182; 337/14; 337/158; 337/167; 338/22 R; 361/106

(58) Field of Search .................................... 337/182–184, 337/12, 14, 158, 137, 140, 167; 338/22 R, 225 D, 23, 24; 361/103, 106, 105

(56) References Cited

U.S. PATENT DOCUMENTS

| | | | | |
|---|---|---|---|---|
| 2,386,903 | * | 10/1945 | Lutomirski | 219/20 |
| 2,947,844 | * | 8/1960 | Howling | 219/20 |
| 3,369,207 | * | 2/1968 | Hasegawa et al. | 338/23 |

(List continued on next page.)

FOREIGN PATENT DOCUMENTS

| | | | | |
|---|---|---|---|---|
| 0 829 939A | | 3/1998 | (EP) . | |
| 63-175 | * | 1/1988 | (JP) | 236/74 R |
| 63-716 | * | 1/1988 | (JP) | 34/96 R |

(List continued on next page.)

OTHER PUBLICATIONS

Patent Abstracts of Japan, vol. 012, No. 104 (P–685), Apr. 6, 1988, & JP 62–238429A (Matsushita Electric Works Ltd), Oct. 19, 1987; category Y.

Patent Abstracts of Japan, vol. 015, No. 200 (E–1070), May 22, 1991, & JP 03–054801A (TDK Corp.), Mar. 8, 1991; category A.

(List continued on next page.)

*Primary Examiner*—Leo P. Picard
*Assistant Examiner*—Anatoly Vortman

(57) ABSTRACT

A generally rectangular, planar electrical overcurrent sensing device having a top major surface and a bottom major surface includes a patterned metal foil conductor defined along the top major surface. The metal foil conductor has a first electrode region at one end region, a second electrode region at an opposite end region, and a current-concentrating region extending between the first electrode portion and the second electrode portion. The device further includes a planar sheet of a composition which exhibits PTC behavior and which comprises an organic polymer having a particulate conductive filler dispersed therewithin. The planar sheet has a first major surface in thermal contact with the bridging portion and has an opposite second major surface. A third patterned metal foil electrode secured to the second major surface of the planar PTC sheet is sized and aligned with the current-concentrating region such that heat generated in the current-concentrating region from electrical overcurrent flowing through the metal foil conductor is transferred to the planar sheet exhibiting PTC behavior and reduces a control current flowing to said third patterned metal foil electrode. An insulation layer may be imposed between the patterned metal foil conductor and the PTC sheet layer, and in such case the third patterned metal foil electrode is divided into two conductive areas separated by a gap aligned with the current-concentrating region, thereby providing a four terminal device. Tin pellets may be included in the current-concentrating region to reduce a melting/fracture temperature thereof below a flaming temperature of the organic polymer sheet forming the PTC layer.

27 Claims, 3 Drawing Sheets

U.S. PATENT DOCUMENTS

| | | | | |
|---|---|---|---|---|
| 3,444,399 | * | 5/1969 | Jones | 307/310 |
| 3,503,030 | * | 3/1970 | Matsumoto et al. | 338/23 |
| 3,505,632 | * | 4/1970 | Matsuzaki et al. | 338/23 |
| 3,614,345 | * | 10/1971 | Quinn | 200/2 |
| 3,673,538 | * | 6/1972 | Faxon | 338/25 |
| 3,737,622 | * | 6/1973 | Hallgreen | 219/364 |
| 3,828,292 | * | 8/1974 | Grossman et al. | 337/417 |
| 3,839,692 | * | 10/1974 | Plasko | 337/182 |
| 3,872,418 | * | 3/1975 | Plough et al. | 338/23 |
| 4,223,209 | | 9/1980 | Diaz | 219/549 |
| 4,237,441 | | 12/1980 | van Konynenburg et al. | 338/22 R |
| 4,238,812 | | 12/1980 | Middleman et al. | 361/106 |
| 4,315,237 | | 2/1982 | Middleman et al. | 338/22 R |
| 4,316,080 | * | 2/1982 | Wroblewski | 219/505 |
| 4,317,027 | | 2/1982 | Middleman et al. | 219/553 |
| 4,426,633 | | 1/1984 | Taylor | 338/25 |
| 4,450,496 | * | 5/1984 | Doljack et al. | 361/58 |
| 4,486,737 | | 12/1984 | Ott | 338/22 R |
| 4,504,817 | * | 3/1985 | Shikama et al. | 338/23 |
| 4,545,926 | | 10/1985 | Fouts et al. | 252/511 |
| 4,562,313 | * | 12/1985 | Tomlinson et al. | 179/175 |
| 4,685,025 | | 8/1987 | Carlomagno | 361/106 |
| 4,689,475 | | 8/1987 | Matthiesen | 219/553 |
| 4,724,417 | | 2/1988 | Au et al. | 338/22 R |
| 4,774,024 | | 9/1988 | Deep et al. | 252/511 |
| 4,780,598 | * | 10/1988 | Fahey et al. | 219/511 |
| 4,800,253 | | 1/1989 | Kleiner et al. | 219/553 |
| 4,845,838 | | 7/1989 | Jacobs et al. | 29/671 |
| 4,857,880 | | 8/1989 | Au et al. | 338/22 R |
| 4,859,836 | | 8/1989 | Lunk et al. | 219/548 |
| 4,907,340 | | 3/1990 | Fang et al. | 29/610.1 |
| 4,924,074 | | 5/1990 | Fang et al. | 219/548 |
| 4,935,156 | | 6/1990 | van Konynenburg | 219/553 |
| 4,967,176 | | 10/1990 | Horsma et al. | 338/22 R |
| 5,049,850 | | 9/1991 | Evans et al. | 338/22 R |
| 5,089,801 | | 2/1992 | Chan et al. | 338/22 R |
| 5,097,247 | * | 3/1992 | Doerrwaechter | 337/405 |
| 5,153,805 | | 10/1992 | Tennant et al. | 361/27 |
| 5,166,658 | * | 11/1992 | Fang et al. | 338/23 |
| 5,378,407 | | 1/1995 | Chandler et al. | 252/513 |
| 5,386,335 | | 1/1995 | Amano et al. | 361/56 |
| 5,436,609 | | 7/1995 | Chan et al. | 338/22 R |
| 5,453,726 | * | 9/1995 | Montgomery | 337/290 |
| 5,663,702 | | 9/1997 | Shaw, Jr. et al. | 337/183 |
| 5,668,522 | * | 9/1997 | Kondo et al. | 337/198 |
| 5,831,510 | | 11/1998 | Zhang et al. | 338/22 R |
| 5,852,397 | | 12/1998 | Chan et al. | 338/22 R |

FOREIGN PATENT DOCUMENTS

| | | |
|---|---|---|
| WO 94/01876 | 1/1994 | (WO) . |
| WO 95/08176 | 3/1995 | (WO) . |
| WO 95/31816 | 11/1995 | (WO) . |
| WO 98/02946 | 1/1998 | (WO) . |
| Wo 98/02947 | 1/1998 | (WO) . |

OTHER PUBLICATIONS

U.S. Patent Application No. 08/682,067 (Myong et al, filed Jul. 16, 1996); counterpart of International Publication No. WO 98/02946, published Jan. 22, 1998.

U.S. Patent Application No. 08/682,172 (Myong, filed Jul. 16, 1996); counterpart of International Publication No. WO 98/02947, published Jan. 22, 1998.

U.S. Patent Application No. 09/248,166 (Myong, filed Feb. 9, 1999).

* cited by examiner

FIG. 3
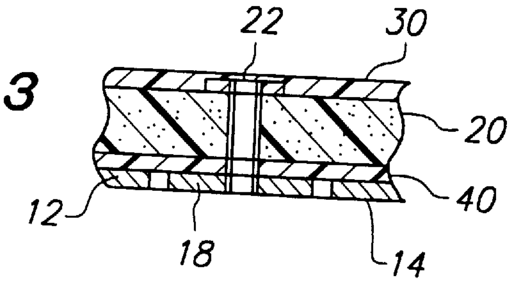
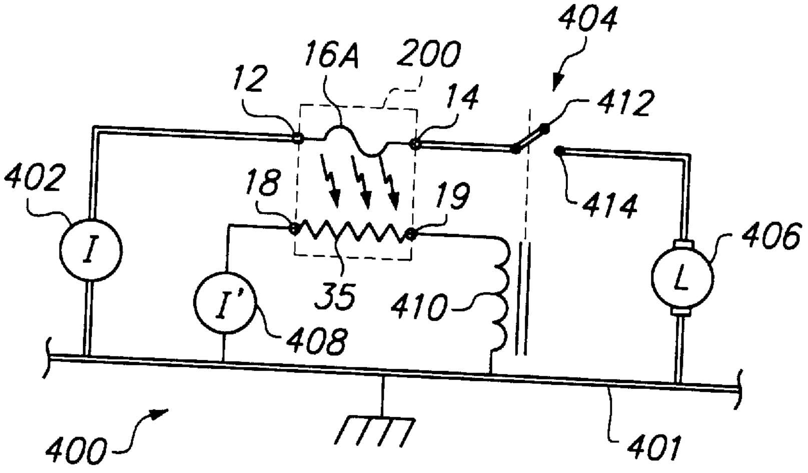
FIG. 4
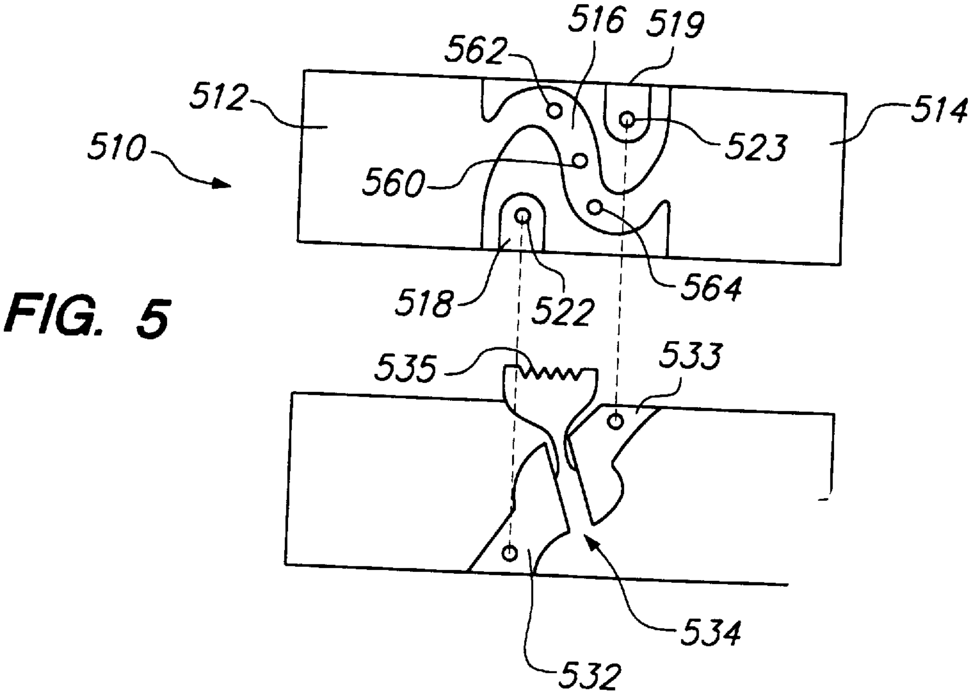
FIG. 5

CIRCUIT PROTECTION DEVICES

RELATED APPLICATIONS

This application is related to U.S. Patent Application Ser. No. 09/248,166 (Myong, filed on Feb. 9, 1999), which is a continuation of U.S. Patent Application Ser. No. 08/869,905 (filed on Jun. 4, 1997), now abandoned. The disclosure of the patent and application is incorporated herein by reference for all purposes.

BACKGROUND OF THE INVENTION

Field of the Invention

This invention relates to improvements in electrical circuit overcurrent protection devices including a current-concentrating conductor physically integrated into, and thermally coupled to, a PTC overcurrent sensor device.

Introduction to the Invention

Positive temperature coefficient (PTC) circuit protection devices are well known. The device is placed in series with a load, and under normal operating conditions is in a low temperature, low resistance state. However, if the current through the PTC device increases excessively and/or the ambient temperature around the PTC device increases excessively, and if either condition is maintained for more than the normal operating time, then the PTC device will be "tripped," i.e., converted to a high temperature, high resistance state such that the current is reduced substantially. Generally, the PTC device will remain in the tripped state, even if the current and/or temperature return to their normal levels, until the PTC device has been disconnected from the power source and allowed to cool. Particularly useful PTC devices contain a PTC element which is composed of a PTC conductive polymer, i.e. a composition which comprises (1) an organic polymer, and (2) a particulate conductive filler, preferably carbon black and/or a conductive inorganic filler, e.g. a ceramic oxide or a metal carbide, nitride, or boride such as titanium carbide, which is dispersed, or otherwise distributed, in the polymer. PTC conductive polymers and devices containing them are described, for example in U.S. Pat. Nos. 4,237,441, 4,238,812, 4,315,237, 4,317,027, 4,426,633, 4,545,926, 4,689,475, 4,724,417, 4,774,024, 4,780,598, 4,800,253, 4,845,838, 4,857,880, 4,859,836, 4,907,340, 4,924,074, 4,935,156, 4,967,176, 5,049,850, 5,089,801 and 5,378,407, and in International Patent Publication Nos. WO 94/01876, WO 95/08176 and WO 95/31816 (corresponding to U.S. Patent Application Ser. Nos. 08/710,925(Zhang et al, filed Sep. 24, 1996) and 08/727,869 (Graves et al, filed Oct. 8, 1996)), the disclosures of which are incorporated herein by reference for all purposes. Ceramic PTC materials are also well known in the art. Negative temperature coefficient (NTC) circuit protection devices containing ceramic NTC materials are also well known in the art.

U.S. Patent Application Ser. No. 08/682,067, the disclosure of which has been published as International PCT Application Publication No. WO 98/02946 on Jan. 22, 1998, describes an overcurrent protection system which will give a rapid response to even relatively small overcurrents. In that system, a sensor element and circuit interruption element are placed in series between a current source and an electrical load. The sensor element is functionally linked to the circuit interruption element via a control element, so that, when the current in the circuit exceeds a predetermined amount, the sensor element senses the overcurrent and communicates with the control element. The control element causes the circuit interruption element to change from a normal operating state to a fault state. The normal state may be either conducting or non-conducting, and the fault state will be an inverse of the normal state, i.e., respectively non-conducting (including a completely open state), or conducting, depending upon the particular overcurrent protection circuit arrangement. In a preferred embodiment, the sensor element comprises a resistive device connected in series with the load, and the control element comprises a PTC device which is thermally linked to the resistive device and is electrically connected to the circuit interruption element. When an overcurrent passes through such a system, the resistive device increases in temperature causing the PTC device to heat up and trip to a high resistance state. The PTC device is linked to the circuit interruption element so that the increased resistance of the PTC device causes the circuit interruption element to switch into its fault state. The PTC device is not placed in series with the load and therefore may operate at current levels much lower than the normal circuit current which passes through the load.

The application Ser. No. 09/248,166 (Myong, filed on Feb. 9, 1999) referenced above provided an important advance in overcurrent protection devices. The protection devices disclosed in this application comprise a generally rectangular and planar sheet of material exhibiting PTC properties comprised of an organic polymer having a particulate conductive filler dispersed therewithin. The generally rectangular, planar sheet has a first major surface and has an opposite second major surface. In accordance with principles of the invention disclosed therein a first conductive layer comprises a patterned unitary metal foil which is thermally bonded and electrically connected to the first major surface of the PTC sheet. The patterned metal foil defines a current conductor including a first terminal electrode region at one end of the sheet, a second terminal electrode region at a second end of the sheet, and a generally thinned, current-concentrating region or portion extending between the first and second terminal electrode regions. As described in this prior patent application a second conductive layer of metal foil extends substantially entirely across opposite second major surface of the PTC sheet. One drawback of this prior approach is that the current-concentrating portion of the patterned metal foil concentrated heat from overcurrent at a small areal surface region of the PTC sheet, whereas current gradients were present and were collected across the entire opposite second major surface of the PTC sheet material, resulting in a less sensitive PTC overcurrent sensor than desired. Another drawback of the prior approach is that a control current necessarily flowed from the patterned metal foil through the PTC sheet to the second conductive layer, whereas in some electrical control circuits electrical circuit isolation is desired or needed. Finally, while the device usually provided protection against most over-current conditions, a critical overcurrent level caused the prior device to overheat and self-destruct if overheating continued continuously for a period of time. One example of a potentially destructive critical overcurrent level may arise when a relay whose load-carrying contacts are protected by the prior device became fused or welded together during an overcurrent condition. If contact welding or fusing occurs, an overcurrent continues to flow between source and load, even after the relay coil circuit is opened. In this situation heating at the current-concentrating region of the patterned metal foil conductor can result in a pyrolitic reaction at the PTC sheet layer and cause a potentially devastating electrical fire. Drawbacks such as these are overcome by improvements in accordance with principles of the present invention.

SUMMARY OF THE INVENTION

In a most general aspect the present invention relates to structural improvements and refinements of electrical devices which combine a current-concentrating load-carrying conductor element and a sensor element which is thermally linked to the conductor element, and exhibits anomalous resistance/temperature behavior, such as PTC behavior.

In a first aspect, this invention provides a generally rectangular, planar electrical overcurrent sensing device having a planar substrate with a top major surface and a bottom major surface and including a patterned metal foil conductor defined along the top major surface, the metal foil conductor having a first electrode region at one end region, a second electrode region at an opposite end region, and a current-concentrating region extending between the first electrode portion and the second electrode portion. In one example, the substrate is formed of a composition which exhibits PTC behavior and which comprises an organic polymer having a particulate conductive filler dispersed therewithin. In another example, the substrate is formed of a non-conductive printed circuit board composition and has a PTC device attached thereto or included as a part thereof at the vicinity of the current-concentrating region. The substrate includes a first major surface in thermal contact with the current-concentration region and an opposite second major surface. At least a third patterned metal foil control electrode is secured to the second major surface of the substrate in alignment with the current-concentrating region such that heat generated in the current-concentrating region from electrical overcurrent flowing through the metal foil conductor is transferred to the circuit element exhibiting PTC behavior and results in a control current flow from at least one of the first and second electrode regions via the PTC element to the third patterned metal foil electrode.

In a second aspect, this invention provides a generally rectangular, planar electrical overcurrent sensing device having a top major surface and a bottom major surface and including a first patterned metal foil conductor defined along the top major surface, the metal foil conductor having a first electrode region at one end region, a second electrode region at an opposite end region, and a current-concentrating region extending between the first electrode portion and the second electrode portion. The device further includes a planar laminar structure comprising a sheet of dielectric material and a sheet of a composition which exhibits PTC behavior and which comprises an organic polymer having a particulate conductive filler dispersed therewithin, the planar laminar structure having a first major surface in thermal contact with the current-concentrating region and having an opposite second major surface. A second patterned metal foil structure defines two spaced-apart contact pads secured to the second major surface of the PTC sheet in alignment with the current-concentrating region and extending third and fourth electrode regions respectively such that heat generated in the current-concentrating region from electrical overcurrent flowing through the metal foil conductor is transferred to the planar sheet exhibiting PTC behavior and enables an altered control current flow between said third and fourth electrode regions indicative of, and isolated from, electrical overcurrent flowing through the metal foil conductor.

In a third aspect, this invention provides a generally rectangular, planar electrical overcurrent sensing device having a top major surface and a bottom major surface and including a patterned metal foil conductor defined along the top major surface, the metal foil conductor having a first electrode region at one end region, a second electrode region at an opposite end region, and a current-concentrating region extending between the first electrode region and the second electrode region. The device further includes a planar sheet of a composition which exhibits PTC behavior and which comprises an organic polymer having particulate conductive filler dispersed therewithin, the planar sheet having a first major surface in thermal contact with the current-concentrating region and having an opposite second major surface. A third metal foil electrode is secured to the second major surface of the planar PTC such that heat generated in the current-concentrating region from electrical overcurrent flowing through the metal foil conductor is transferred to the planar sheet exhibiting PTC behavior and reduces a control current flowing to said third patterned metal foil electrode. In this aspect of the invention, the current-concentrating region of the patterned metal foil conductor is characterized by overcurrent fail-safe properties enabling the current-concentrating region to rupture and open in response to a sustained overcurrent condition at a temperature below a pyrolitic or flaming temperature of the organic polymer PTC sheet material.

In a fourth aspect of the present invention, an electrical overcurrent sensing device comprising a substrate such as a single or two-sided printed circuit board having a top major surface of the substrate including a patterned metal foil conductor having a current source region, a current load region and a current-concentrating region extending between the current source connection region and the current load connection region. In this aspect a PTC resistor is supported by the substrate either at the top surface, or at a bottom surface, at the current-concentrating region. The PTC resistor is electrically connected to an overcurrent sense region such that heat generated in the current-concentrating region from electrical overcurrent flowing through the metal foil conductor is transferred to the PTC resistor and results in a control current flow to the overcurrent sense region. A second overcurrent sense region is provided when electrical isolation from the circuit of the metal foil conductor is needed. The current concentrating region may have a narrowed trace width, or it may have a thinned height dimension. The substrate may be formed of an organic polymer, and one or more melting-temperature-reducing alloying pellets may be provided at the current concentrating region to cause melting below a flaming temperature of the organic substrate material.

The devices of the invention are particularly useful in circuits in which (a) the first and second electrodes and the current-concentrating region are in series with the load, and (b) the organic polymer PTC element electrodes are in series with a control element which is coupled to a circuit interruption element so that, when there is an overcurrent through the load, the reduction of current through the control element activates the circuit-interruption element to interrupt, or to reduce substantially, the current through the load. If an overcurrent condition continues for an extended time and current level, as might occur because of welding or fusing of relay contacts of the circuit-interruption element, the current-concentrating region will rupture and fail in a safe manner and at a temperature below a pyrolytic or flaming temperature of the organic polymer PTC layer.

The devices of the invention are particularly useful within protection circuits for protecting relatively high direct current, relatively low voltage loads frequently encountered in electro-mechanical environments, such as motor vehicles which typically include electric loads such as lights and motors for starting, operating windows, seats, radio aerials, cooling fans, etc., and which present overcurrent conditions upon motor starting and stalls or bearing/bushing failures, etc. Typical electrical currents in these uses are typically on the order of one or several Amperes up to as high as 100 Amperes, or higher. For example, an electrical radiator fan motor in a motor vehicle might have a normal operating current of 30 Amperes, and a stall current of 70 Amperes at which an overcurrent protection circuit including a device of the present invention trips and interrupts the load current.

The invention also includes electrical assemblies which can be divided into a plurality of discrete devices of the invention in a manner described in U.S. Patent Application Ser. No. 09/248,166, referenced and incorporated hereinabove.

The principles of the present invention may be followed in providing discrete devices, or they may be followed in providing circuit boards or sub-assemblies which include overcurrent protection printed trace regions or areas which are not discrete from other regions, areas or circuit paths thereof.

These and other objects, advantages, aspects and features of the present invention will be more fully understood and appreciated by those skilled in the art upon consideration of the following detailed description of preferred embodiments, presented in conjunction with the accompanying drawings.

BRIEF DESCRIPTION OF THE DRAWINGS

The invention is illustrated in the accompanying drawings, in which:

FIG. 3 is a view in elevation and section of the FIG. 2 device, taken along line 3—3 in FIG. 2;

FIG. 4 is a schematic electrical circuit diagram of a circuit including an overcurrent protection device of the present invention;

FIG. 5 is an enlarged and separated view of yet another overcurrent protection device in accordance with principles of the present invention;

DETAILED DESCRIPTION OF THE INVENTION

Figure 1:
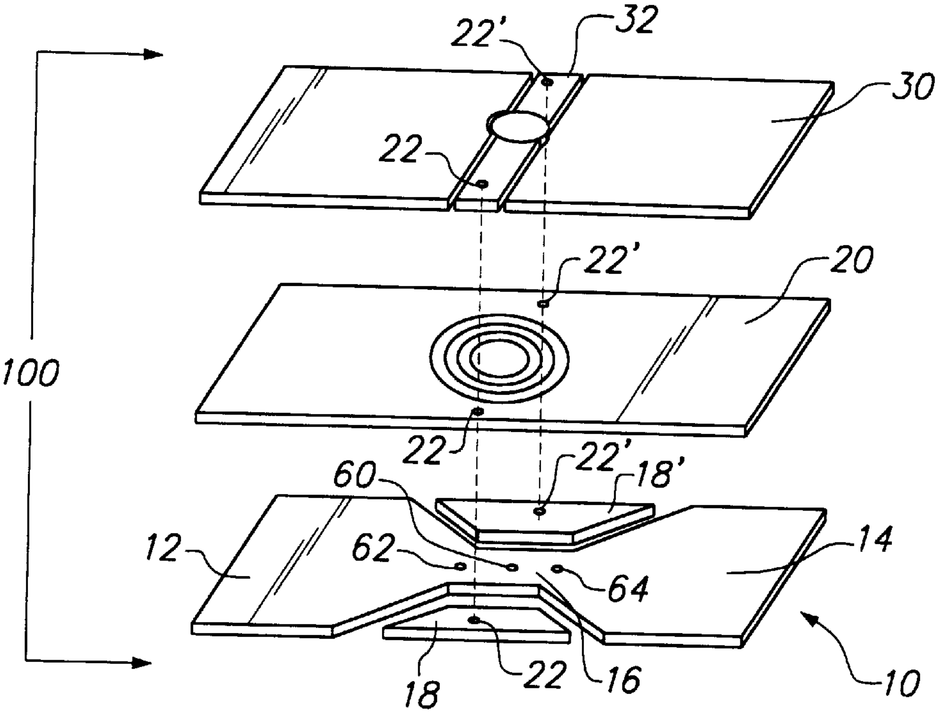
FIG. 1 is an enlarged and exploded isometric view of an overcurrent protection device in accordance with principles of the invention.

A device 100 in accordance with principles of the present invention is shown in FIG. 1. Therein, the device 100 includes a first planar layer comprising a conductor 10 having a widened input terminal region 12, a widened output terminal region 14, and a narrowed current-concentrating bridging portion 16. Control electrodes 18 and 18' are also within the first planar layer. For example, the conductor 10 and the control electrodes 18 and 18' are preferably formed by removing part of the metal from the central portion of a single piece of sheet metal e.g. (a) by etching a layer of metal (for example a metal foil) already conventionally secured to a layer of PTC material 20 (which is not changed by the etching process), or (b) by stamping a piece of metal before it is connected to the remainder of the device, or (c) by stamping a laminate of a metal layer and a PTC layer (in which case the PTC layer and any other layer of the laminate, e.g. a layer 30 including a current-collecting control layer 32 on the opposite surface of the laminate, assumes the same shape). The cross-sectional area of the current-concentrating bridging portion 16 (at right angles to the direction of current flow) is preferably 0.1 to 0.8, particularly 0.15 to 0.5 times the cross-sectional area of each of the terminal regions 12 and 14. Plated-through conductive vias 22 passing through the PTC layer 20 interconnect the control electrodes 18 and 18' directly to the current-collecting layer 32.

The PTC layer 20 is preferably in the form of a planar sheet having first and second major surfaces. The planar conductor 10 is secured to the first major surface and a current-collecting layer 32 is secured to the opposite second major surface. The PTC material preferably comprises an organic polymer and, dispersed therein, a particulate conductive filler. However, it is also possible to use other materials manifesting desired PTC characteristics, including the well-known PTC ceramics. The resistivity and thickness of the PTC material and the thermal coupling between the current-concentrating bridging portion 16 and the PTC layer 20 should be selected so as to achieve (a) the desired current between the conductor 10 and the current-collecting control electrodes 18 and 18' (i.e. through a resistor provided by the PTC layer 20) during normal operation and (b) the desired reduction in that current when there is an overcurrent fault condition. If desired, a body of thermally and electrically insulating material can be placed over at least part of, and often all of, the conductor 10 and electrodes 18 and 18'; and/or a layer of a thermally (and optionally electrically) conductive material can be placed between the current-concentrating bridging portion 16 and the PTC layer 20 in order to modify (usually to increase) the amount of the heat transferred to the resistor formed by the PTC layer 20. It is usually desirable that a fault condition should reduce the current between the conductor 10 and the control electrodes 18, 18' to less than 0.6 times, particularly less than 0.4 times, the normal operating current flowing along the control path.

Following completion of the device 100 a conformal protective overcoat may be applied cover all external areas except where direct contact access is needed for electrical connections. The protective material, commonly known as "solder mask", is of a suitable polymeric resin material which may be spin coated or otherwise selectively deposited onto the completed device 100.

As shown in FIG. 1, when excessive current is concentrated in the current-concentrating bridging portion 16 of the conductor 10, heating results. This heating is localized at the vicinity of the bridging portion 16 and creates a thermal gradient in the adjacent, thermally coupled PTC layer 20 which radiates outwardly from the heat source, as depicted diagramatically in FIG. 1 by a series of concentric circles radiating outwardly from the vicinity of the bridging portion 16. Since the entirety of the PTC layer 20 manifests a predetermined uniform PTC characteristic, that characteristic varies along the resultant thermal gradient. In accordance with principles of the present invention and in order to improve sensitivity and control of the PTC trigger point, a third electrode 32 is shaped to be in electrical contact with the PTC layer 20 primarily at the vicinity of the thermal gradient and not across the entire surface extent of the PTC layer 20, as was heretofore the practice taught by the referenced U.S. Patent Application Ser. No. 09/248,166.

Figure 2:
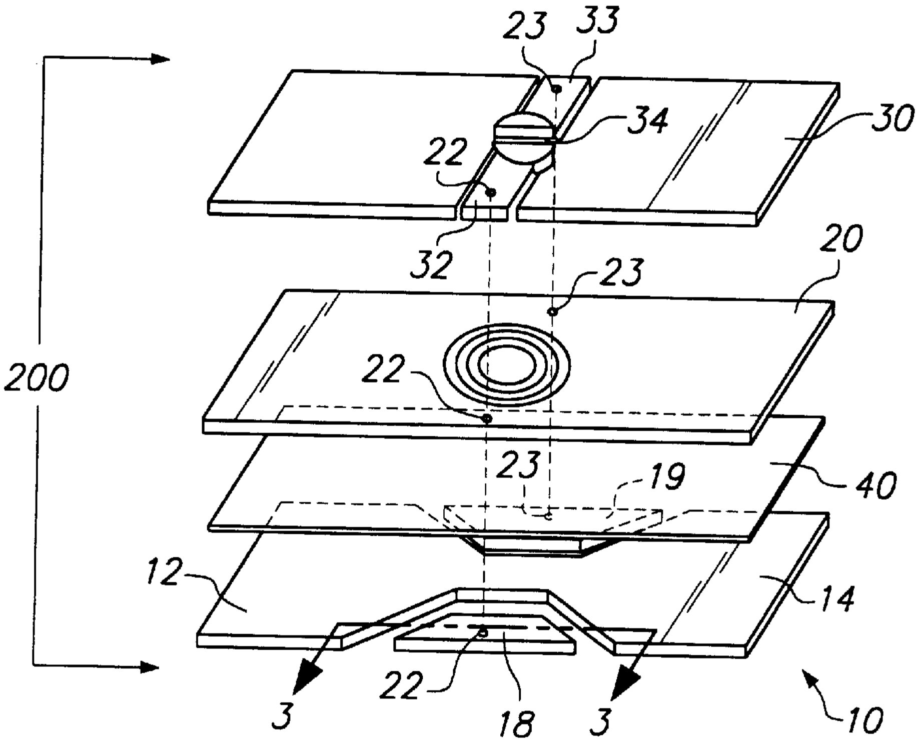
FIG. 2 is an enlarged and exploded isometric view of another overcurrent protection device in accordance with principles of the invention.

In some applications it is desirable to isolate the control current flowing through the PTC layer 20 from the main current path through the conductor 10. FIG. 2 presents another protection device 200 providing such isolation and comprising an improvement upon the devices of the referenced U.S. Patent Application Ser. No. 9/248,166. In FIG. 2 the same elements and parts which are present in the FIG. 1 device 100 have the same reference numerals. In the protection device 200 an electrical insulation layer 40 is interposed between the plane of the conductor 10 and control electrodes 18 and 19, and the PTC layer 20. The insulation layer 40 is most preferably formed of a high-temperature-resistant polymer film, such as PVDF or one of the high-temperature-resistant derivatives of nylon (synthetic long-chain polymeric amides having recurring amide groups). The layer 40 should have a sufficient thickness to be practically manufacturable and to have desired electrical dielectric properties sufficient to withstand voltage spikes associated with transients in the operating environment. In automotive applications, the polymer film layer may preferably be on the order of at least approximately 0.001 inch thickness and be capable of withstanding voltage spikes on the order of 100 volts peak. In contrast to the single current-collecting control layer 32 shown in the FIG. 1 device 100, the device 200 of FIG. 2 has two current-collecting control segments 32 and 33 which are separated by a narrow gap 34 most preferably centered at a center of the thermal gradient of the PTC layer 20. In the device 200 a control resistor 35 is formed primarily by a region of the PTC layer 20 lying between the control segments 32 and 33. At least one via 22 connects the segment 32 to the electrode 18, and at least one via 23 connects the segment 33 to the electrode 19.

FIG. 4 depicts a protection circuit 400 incorporating a device 200 of the present invention. Therein, a primary current source 402 supplies a primary operating current through the planar conductor 10 of device 200. When contacts 412 and 414 of a protection relay 404 are closed, the primary current reaches and flows through a load 406, such as a relatively high current DC brush motor within an automotive application. Current returns to the primary source 402 via a common or ground path 401. A control current source 408 which is separate from the primary current source 402 is connected to electrode 18 and supplies control current through the PTC resistor 35. The electrode 18 of the control resistor supplies the control current to a coil 410 of the relay 404 and ordinarily causes the contacts 412 and 414 to close, thereby completing the circuit between the primary source 402 and the load 406. If an overcurrent condition appears at the load 406, as when the motor stalls, the current-concentrating bridging portion 16A of the planar metal film conductor 10 heats up. The heat is transferred to the PTC layer 20 and radiates into the layer 20 in accordance with the thermal gradient. Since the resistor 35 effectively lies in a region 34 at the center of the thermal gradient, a trip state is reached when the electrical resistance of the resistor 35 increases sufficiently to cease delivering sufficient current to the coil 410 to keep the contacts 412 and 414 closed. In normal conditions, the contacts 412 and 414 open, thereby removing the primary current causing the overcurrent fault condition at the load 406.

There are certain rare circumstances in which the relay contacts 412 and 414 become welded or fused together by the overcurrent fault condition. One cause of relay contact welding is high current relay make or break operation. If the relay contacts 412 and 414 become fused together from any cause whatsoever, removal of the control current through the relay coil 410 will not cause the contacts 412 and 414 to open, and the bridging portion 16A continues to concentrate electrical current and generate heat. Another circumstance requiring overcurrent protection may arise from overheating of the relay coil resulting in distortion of the relay frame or baseplate. Such distortion may prevent the relay contacts from opening when current is removed from the relay coil.

In the circumstance of a very high magnitude overcurrent condition, the current-concentrating bridging portion 16A simply separates and fails safe, removing the overcurrent condition from the load. However, there are some intermediate overcurrent conditions which do not cause the current-concentrating bridging portion 16A to fail immediately. When the metal foil conductor 10 is formed of copper alone, it may not melt and open the primary current path until a very high temperature is reached (i.e. substantially pure copper reaches molten state at about 1083 degrees C.).

Under these intermediate overcurrent conditions the copper, current-concentrating bridging portion 16A starts to glow but does not rupture. When the pyrolysis temperature of the organic polymeric materials comprising layers 20 and 40 is exceeded (typically in a range between 400 and 500 degrees C.) these layers decompose. If the temperature is well above the pyrolysis temperature, these layers 20 and 40 can burst into flames and cause an electrical fire within the environment to be protected (e.g. automobile engine compartment). Another aspect of the present invention removes or greatly reduces this hazard.

It is known that if another metal, such as tin, becomes alloyed with copper, the melting point of the resultant alloy becomes reduced from over 1000 degrees C. to as low as 200–300 degrees C. One known technology used in conventional fuse design and discovered by Metcalf in the 1940's is to provide small pellets of tin in wells of a current-concentrating region of a copper fuse link. When the overcurrent causes the copper to reach a high temperature, the tin pellets melt and begin to mix with and alloy with the copper, and the resultant alloy separates at a much lower temperature than the elemental melting temperature of copper. Also, until the tin pellets melt, they do not substantially interfere with the current handling properties of the copper fuse link.

The present invention combines the Metcalf principle into the current-concentrating portion 16A of the metal film conductor. Referring to FIG. 1, the bridging portion 16 is provided with a central opening 60 and two spaced-apart openings 62 and 64 each containing or holding a pellet of tin. When the bridging portion 16 of the FIG. 1 device 100 reaches an alloying temperature during an overcurrent condition, the tin pellets melt and become alloyed with the adjacent copper film of the bridging portion 16. The copper-tin alloyed portion then melts and separates to thereby open the primary electrical current path, at a controllably lower temperature which is well below the flaming temperature of the organic polymer material comprising the PTC layer 20. This fuse-like property of the primary current metal film conductor 10 is depicted schematically in the FIG. 4 circuit.

FIG. 5 presents an alternative geometry for the metal layers of a device in accordance with principles of the present invention. The device could be a three-terminal device in accordance with the FIG. 1 embodiment and have only a PTC layer 20, or it could be a four terminal device as shown in FIG. 2 and have an insulating layer 40 separating the metal conductor layer from the PTC layer 20. In the FIG. 5 device, a metal foil conductor 510 includes in input terminal portion 512, an output terminal portion 514 and a sinuous bridging portion 516. Control electrodes 518 and 519 are located spatially in regions not occupied by the sinuous bridging portion 516. The control current-collecting foil layers 532 and 533 define a gap 534 which is generally aligned with the sinuous path of the bridging portion 516. Via 522 connects layer 532 to electrode 518, and via 523 connects layer 533 to electrode 519. A PTC resistor 535 is substantially and primarily present in the PTC layer 20 at the region of the gap 534. A central opening 560 defined in the sinuous bridging portion 516, and two openings 562 and 564 defined oppositely adjacent to opening 560, contain melting-temperature-reducing alloying materials such as, tin pellets in order to form the sinuous bridging portion into a fail-safe fuse at a controlled relatively low temperature.

Figure 6:
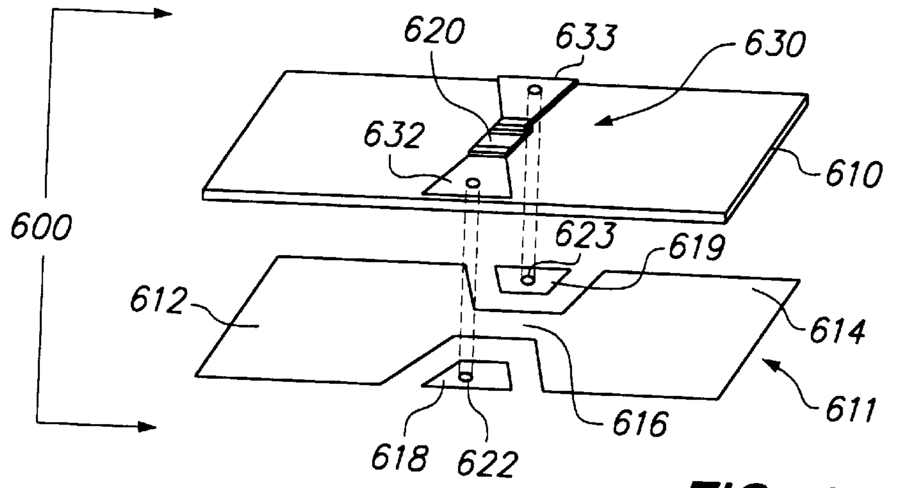
FIG. 6 is an enlarged and exploded isometric view of a further overcurrent protection device in accordance with principles of the present invention.

Referring now to FIG. 6, a device 600 provides another alternative embodiment of the present invention. The device 600 comprises a double sided printed circuit board having a dielectric core layer 610, and copper cladding on each major surface. One major surface 611 includes patterned copper cladding defining a widened input terminal region 612, a widened output terminal region 614 and a narrowed current-concentrating portion 616 bridging the terminal regions 612 and 614. Control electrodes 618 and 619 are also defined at the one major surface 611. A second major surface 630 includes patterned copper cladding defining a first bonding pad 632 and a second bonding pad 633 generally aligned with the control electrode regions 618 and 619 and respectively connected thereto by plated-through vias 622 and 623. A small rectangular PTC element 620 is formed across and electrically connected to the first and second bonding pads 632 and 633. The PTC element 620 may be deposited, laminated, coated, printed, fused, or formed as a surface mount discrete component and soldered or otherwise edge-bonded to, the bonding pads 632 and 633. Irrespective of the particular formation/attachment method followed, the PTC element 620 is in thermal contact with the dielectric substrate 610 directly over the current-concentrating bridging region 616 of surface 611, so that heat generated at the current-concentrating region 616 as a result of an overcurrent condition is effectively transferred to the PTC element 620 and results in development of a control signal across control electrodes 618 and 619 as previously explained herein. Ideally, the printed circuit board substrate 610 is made as thin as structurally practical, and most preferably has an overall thickness of approximately 0.005 inch or less. The dielectric material forming the substrate 610 may be a thin polyester material such as Mylar (tm) or other suitable thin, flexible substrate. A thin, yet relatively rigid substrate of glass fiber reinforced resin may also be used. Each major surface is preferably coated with a layer of copper in a thickness of approximately 0.00135" (i.e., approximately one ounce of copper per square foot of substrate). The patterning of the copper layers may be carried out by conventional photoresist and chemical etch techniques known to those skilled in the art.

Figure 7:
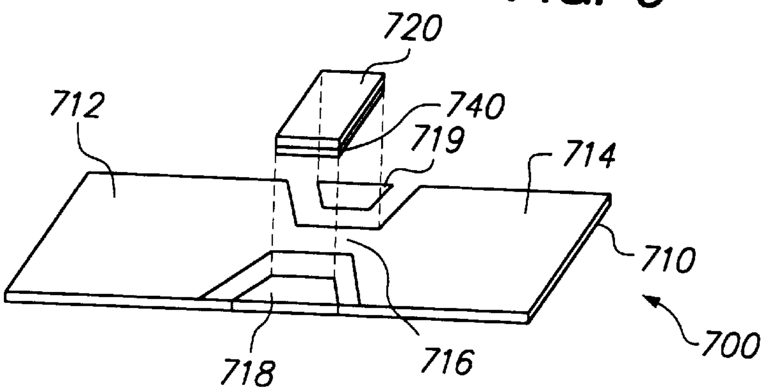
FIG. 7 is an enlarged and exploded isometric view of a still further overcurrent protection device in accordance with principles of the present invention; and, FIGS. 8A and 8B represent respectively an enlarged and exploded isometric view and a sectional view in elevation along section line 8—8 of yet one more overcurrent protection device in accordance with principles of the present invention.

FIG. 7 illustrates a further example of principles of the present invention. An overcurrent protection device 700 is formed on a single-sided printed circuit board having a dielectric support substrate 710 and a single major surface with a conformal coating of copper material. The copper surface layer is suitably patterned to define a widened input terminal region 712, a widened output terminal region 714, and a narrowed current-concentrating region 716 as in the previously discussed examples. Control electrodes 718 and 719 are also defined at the single copper-coated surface. A PTC device 720 is deposited onto, or separately formed and bonded to, the printed circuit board so as to be in direct electrical contact with the control electrodes 718 and 719 and to be in thermal contact with the current-concentrating region 716. A thin layer of electrically insulative material 740 may be interposed between the PTC device 720 and the current-concentrating region 716 in order to provide electrical isolation between the control circuit and the load-carrying conductor comprising regions 712, 714 and 716.

Figure 8A:
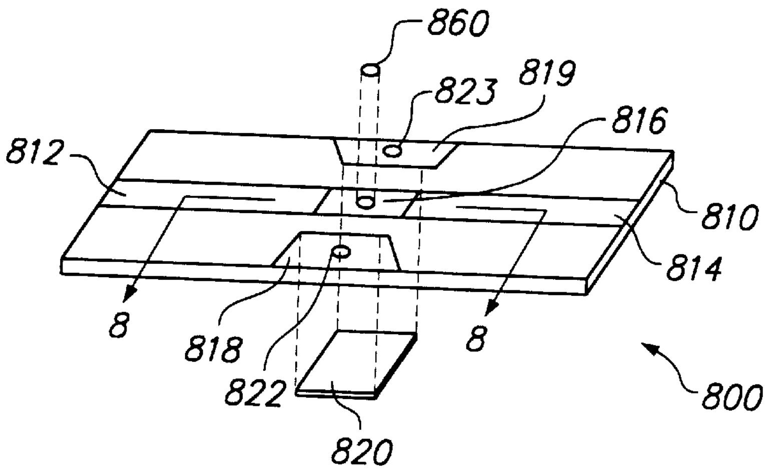
Figure 8B:
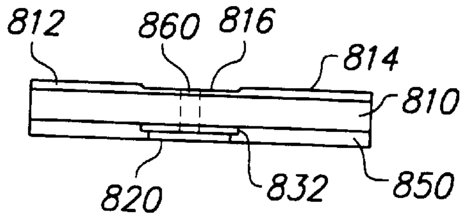

An overcurrent protection device 800 shown in FIGS. 8A and 8B provides a further example of principles of the present invention. A double-sided printed circuit board 810 includes a load-carrying conductor having a current source region 812, a current load region 814 and a height-reduced, thinned current-concentrating region 816. Control electrode regions 818 and 819 are formed on the surface carrying the load-carrying conductor and are arranged to be adjacent to the height-reduced, thinned current-concentrating region 816. A small, generally rectangular PTC element 820 is formed, deposited or attached to an opposite side of the printed circuit board 810 and connects to bonding pads which respectively connect to the regions 818 and 819 by plated-through vias 822 and 823. (Pad 832 is shown in FIG. 8B.) The current-concentrating region 816 may include a pellet 860 of a metal such as tin, which has a lower melting temperature than the copper of the load-carrying conductor trace, thereby rendering the current-concentrating region into a fail-safe fuse in the manner described in connection with the embodiment of FIG. 5, described hereinabove. A conformal coating 850 of solder mask may be provided to encapsulate the printed circuit board 810 at areas not intended for electrical connections to other circuit elements. The completed over-current device 800 operates in the same manner previously described for other embodiments described in this specification.

The particular size and shape of devices implementing principles of the present invention is a function of the desired operational current that is required to operate the circuit component connected in series with the device. Generally devices for automotive applications have a maximum size of 1 inch$^2$ (645 mm$^2$). In general, the resistance measured from the input terminal portion to the output terminal portion is much lower than the resistance measured from the foil conductor to the control electrode of a three terminal device. The device resistance can be controlled by the resistivity of the PTC composition forming the control resistor, as well as by the thickness of the PTC device layer and the geometry of the current collecting layer. Devices of the invention are suitable for use in applications in which the normal operating current, i.e. the current from the input to output terminal portions of the thin film metal conductor, is less than one ampere to currents in excess of 100 amperes, although different devices may be suitable for use in applications with either higher or lower operating currents. The fault current is a current level which will cause damage to any of the components of an electrical circuit between a power source and its current return node. In practical automotive overcurrent protection applications, the fault current has been found to be generally at least 1.35 times, preferably at least 1.4 times, and particularly at least 1.5 times the operating current.

Discrete devices embodying principles of the invention are preferably made from an electrical assembly as described in the referenced U.S. Patent Application Ser. No. 09/248,166. The principles of the present invention may be employed within larger circuit board arrangements and subassemblies including components in addition to those provided and arranged in accordance with the present invention. Accordingly, those skilled in the art will appreciate that many changes and modifications will become readily apparent from consideration of the foregoing descriptions of preferred embodiments without departure from the spirit of the present invention, the scope thereof being more particularly pointed out by the following claims. The descriptions herein and the disclosures hereof are by way of illustration only and should not be construed as limiting the scope of the present invention.

What is claimed is:

1. An electrical overcurrent sensing device having a top major surface and a bottom major surface and including a patterned metal foil conductor defined along the top major surface, the metal foil conductor having a first electrode region at one end region, a second electrode region at an opposite end region, and a current-concentrating region extending between the first electrode region and the second electrode region; a planar sheet of a composition which exhibits PTC behavior, the planar sheet having a first major surface in thermal contact with at least the current-concentrating region of the patterned metal foil conductor and having an opposite second major surface; a patterned metal foil control current collecting layer connected to the second major surface of the planar PTC sheet having a surface area generally limited to and in substantial alignment with the current-concentrating region such that heat generated in the current-concentrating region from electrical overcurrent flowing through the metal foil conductor is transferred to the planar sheet exhibiting PTC behavior and results in a trip-state control current flow to said control current collecting layer before any other elements of a circuit including the device reach a damaging overheating temperature.

2. The electrical overcurrent sensing device set forth in claim 1 further comprising a patterned metal foil control electrode formed in a plane including the patterned metal foil conductor and at least one via interconnecting the control electrode with the control current collecting layer.

3. The electrical overcurrent sensing device set forth in claim 1 wherein the planar sheet of said composition exhibiting PTC behavior comprises an organic polymer having particulate conductive filler dispersed therewithin.

4. The electrical overcurrent sensing device set forth in claim 1 further comprising an electrical insulation layer between the metal foil conductor and the planar sheet of said composition exhibiting PTC behavior, and wherein the patterned metal foil control current collecting layer comprises first and second conductive areas separated by a space generally aligned with the current-concentrating region of the patterned metal foil conductor.

5. The electrical overcurrent sensing device set forth in claim 4 further comprising a first patterned metal foil control electrode formed in a plane including the patterned metal foil conductor and at least a first via interconnecting the first control electrode with the first conductive area, and a second patterned metal foil control electrode formed in the plane and at least a second via interconnecting the second control electrode with the second conductive area.

6. The electrical overcurrent sensing device set forth in claim 3 further comprising melting-temperature-reducing-alloying means located at the current-concentrating region of the patterned metal foil conductor for reducing a melt/rupture temperature of the metal foil conductor to a controlled low level below a flaming temperature of the organic polymer in response to an overcurrent condition.

7. The electrical overcurrent sensing device set forth in claim 6 wherein the patterned metal foil conductor comprises copper, and wherein the melting-temperature-reducing-alloying means comprises at least one tin pellet in alloying contact with the current-concentrating region of the patterned metal foil conductor.

8. The electrical overcurrent sensing device set forth in claim 1 wherein the device is generally rectangular and planar.

9. The electrical overcurrent sensing device set forth in claim 8 wherein the current-concentrating region comprises a narrowed, substantially linear region between the first electrode region and the second electrode region.

10. The electrical overcurrent sensing device set forth in claim 7 wherein the current-concentrating region of the patterned metal foil conductor extends sinuously between the first electrode region and the second electrode region.

11. The electrical overcurrent sensing device set forth in claim 4 wherein the current-concentrating region of the patterned metal foil conductor extends sinuously between the first electrode region and the second electrode region and wherein the space separating the first and second conductive areas follows at least a portion of a sinuous path of the current-concentrating region of the patterned metal foil conductor.

12. An electrical overcurrent sensing device comprising:

a top major surface and a bottom major surface;

a patterned metal foil conductor defined along the top major surface, the metal foil conductor having a first electrode region at one end region, a second electrode region at an opposite end region, and a current-concentrating region extending between the first electrode region and the second electrode region;

a laminar structure including an electrical insulation layer confronting the top major surface and the patterned metal foil conductor and a planar sheet of a composition exhibiting PTC behavior and which comprises an organic polymer having a particulate conductive filler dispersed therewithin, the laminar structure having a first major surface in thermal contact with at least the current-concentrating region of the patterned metal foil conductor and having an opposite second major surface;

a patterned metal foil control current collecting layer comprising first and second conductive areas separated by a space generally aligned with the current-concentrating region of the patterned metal foil conductor such that heat generated in the current-concentrating region from electrical overcurrent flowing through the metal foil conductor is transferred to a resistor formed by a portion of the planar sheet exhibiting PTC behavior in the space between the first and second conductive areas at the vicinity of the current-concentrating region and reduces a control current flowing between said first and second conductive areas through said resistor.

13. An electrical overcurrent sensing device comprising:

a top major surface and a bottom major surface;

a patterned metal foil conductor defined along the top major surface, the metal foil conductor having a first electrode region at one end region, a second electrode region at an opposite end region, and a current-concentrating region extending between the first electrode region and the second electrode region;

a laminar structure including an electrical insulation layer confronting the top major surface and the patterned metal foil conductor and a planar sheet of a composition exhibiting PTC behavior, the laminar structure having a first major surface in thermal contact with at least the current-concentrating region of the patterned metal foil conductor and having an opposite second major surface;

a patterned metal foil control current collecting layer comprising first and second conductive areas separated by a space generally aligned with the current-concentrating region of the patterned metal foil conductor such that heat generated in the current-concentrating region from electrical overcurrent flowing through the metal foil conductor is transferred to a resistor formed by a portion of the planar sheet exhibiting PTC behavior in the space between the first and second conductive areas at the vicinity of the current-concentrating region and reduces a control current flowing between said first and second conductive areas through said resistor, and further comprising a first patterned metal foil control electrode formed in a plane including the patterned metal foil conductor and at least a first via interconnecting the first control electrode with the first conductive area, and a second patterned metal foil control electrode formed in the plane and at least a second via interconnecting the second control electrode with the second conductive area.

14. An electrical overcurrent sensing device comprising:

a top major surface and a bottom major surface;

a first patterned copper foil conductor defined along the top major surface, the copper foil conductor having a first electrode region at one end region, a second electrode region at an opposite end region, and a current-concentrating region extending between the first electrode portion and the second electrode portion;

a planar sheet of a composition which exhibits PTC behavior and which comprises an organic polymer having a particulate conductive filler dispersed therewithin, the planar sheet having a first major surface in thermal contact with the current-concentrating region and having an opposite second major surface;

a third, patterned metal foil electrode secured to the second major surface of the planar sheet exhibiting PTC behavior such that heat generated in the current-concentrating region from electrical overcurrent flowing through the metal foil conductor is transferred to the planar sheet exhibiting PTC behavior and reduces a control current flowing to said third patterned metal foil electrode;

the current-concentrating region of the patterned copper foil conductor including at least one tin-containing pellet means in thermal contact therewith for alloying with the copper of the current-concentrating region in response to a sustained overcurrent condition and thereupon to rupture and fail safe at a controlled low temperature below a flaming temperature of the organic polymer PTC sheet material.

15. An electrical overcurrent sensing device comprising a substrate, a top major surface of the substrate including a patterned metal foil conductor having a current source region, a current load region and a current-concentrating region extending between the current source connection region and the current load connection region, a flat, generally planar PTC resistor which comprises an organic polymer having a particulate conductive filler dispersed therewithin and which is supported by the substrate and is in direct thermal contact with the current-concentrating region and at least one overcurrent sense region, the PTC resistor being electrically connected to the at least one overcurrent sense region such that heat generated in the current-concentrating region from electrical overcurrent flowing through the metal foil conductor is transferred to the PTC resistor and reduces a control current flowing to said overcurrent sense region.

16. The electrical overcurrent sensing device set forth in claim 15 wherein the substrate comprises a dielectric material.

17. The electrical overcurrent sensing device set forth in claim 16 wherein the substrate comprises an organic polymer.

18. The electrical overcurrent sensing device set forth in claim 17 wherein the substrate is flexible.

19. The electrical overcurrent sensing device wet forth in claim 16 wherein the substrate is substantially inflexible.

20. The electrical overcurrent sensing device set forth in claim 16 comprising two overcurrent sense regions defined on the top surface of the substrate, and two PTC resistor connection pads defined on the bottom surface of the substrate in substantial plan alignment with the two overcurrent sense regions and respectively electrically connected thereto by vias, the PTC resistor being arranged and connected across the two PTC resistor connection pads in a manner bridging over the current-concentrating region.

21. The electrical overcurrent sensing device set forth in claim 16 comprising two overcurrent sense regions defined on the top surface of the substrate, the PTC resistor having an insulative layer and being arranged and connected across the two overcurrent sense regions in a manner thermally contacting, and being electrically insulated from, the current-concentrating region.

22. The electrical overcurrent sensing device set forth in claim 15 wherein the current-concentrating region comprises a width-narrowed portion of the patterned metal foil conductor.

23. The electrical overcurrent sensing device set forth in claim 15 wherein the current-concentrating region comprises a height-thinned portion of the patterned metal foil conductor.

24. The electrical overcurrent sensing device set forth in claim 15 wherein the substrate comprises an organic polymer material, and wherein the current-concentrating region includes a pellet of melting-temperature-reducing-alloying material for reducing a melt/rupture temperature of the metal foil conductor to a controlled low level below a flaming temperature of the substrate in response to an overcurrent condition.

25. The electrical overcurrent sensing device set forth in claim 21 wherein the patterned metal foil conductor comprises copper, and further comprising a melting-temperature-reducing-alloying means in thermal contact with the current-concentrating region of the patterned metal foil conductor for alloying with and reducing a melting temperature of the current-concentrating region.

26. The electrical overcurrent sensing device set forth in claim 15 further comprising an overcoat of protective material.

27. The electrical overcurrent sensing device set forth in claim 25 wherein the melting-temperature-reducing-alloying means comprises at least one tin pellet.

* * * * *